Feb. 10, 1931.　　R. HALEY ET AL　　1,792,011
LATTICE OPERATED FLEXIBLE SWITCH
Filed June 24, 1929　　3 Sheets-Sheet 1
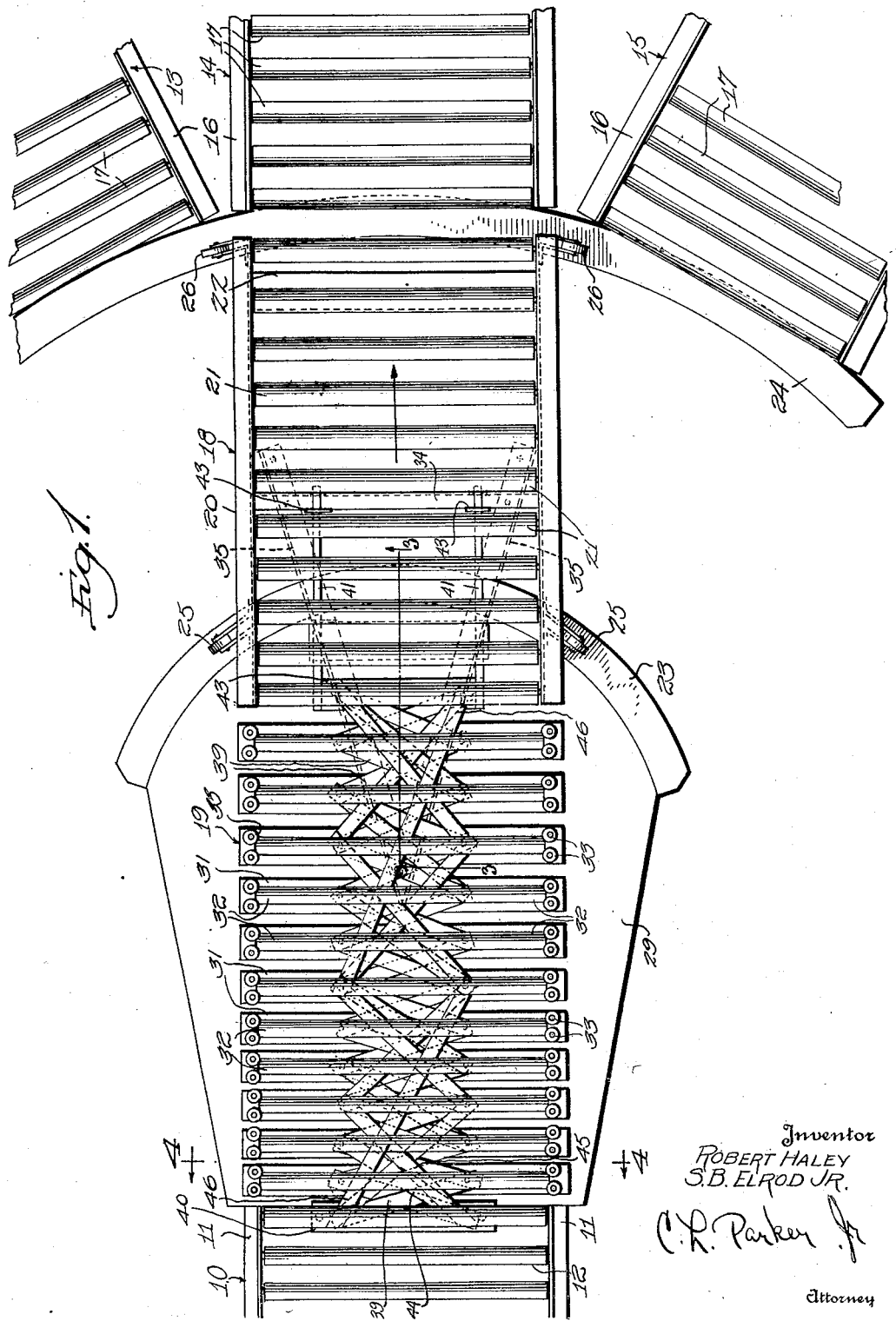

Feb. 10, 1931.  R. HALEY ET AL  1,792,011
LATTICE OPERATED FLEXIBLE SWITCH
Filed June 24, 1929  3 Sheets-Sheet 2
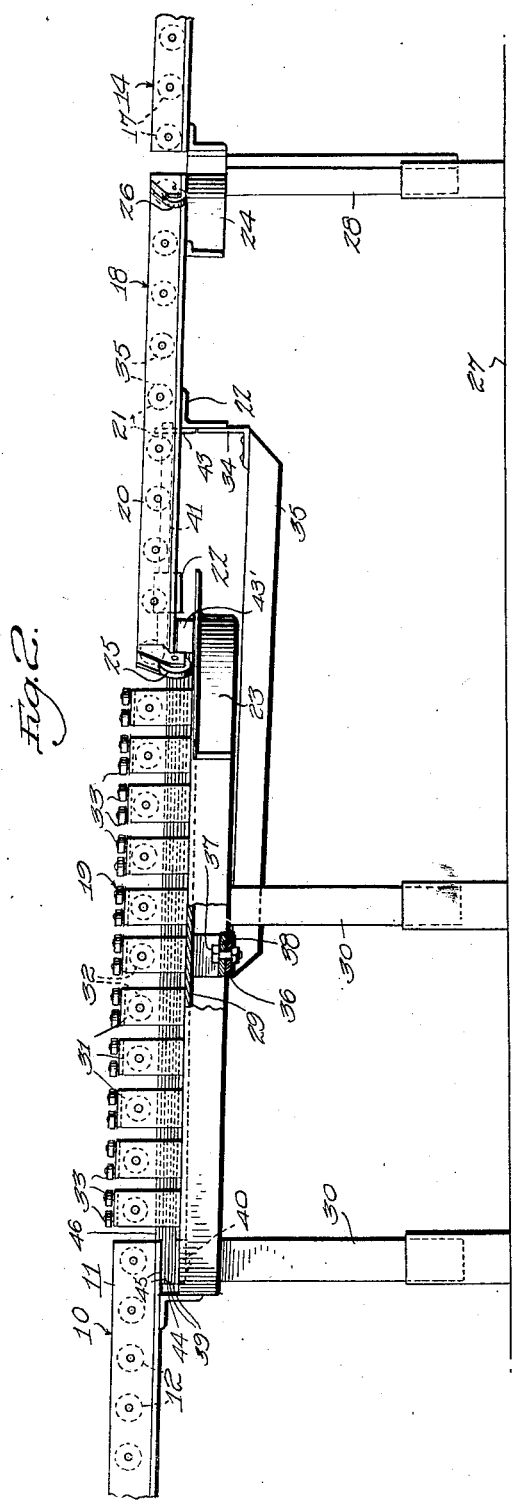
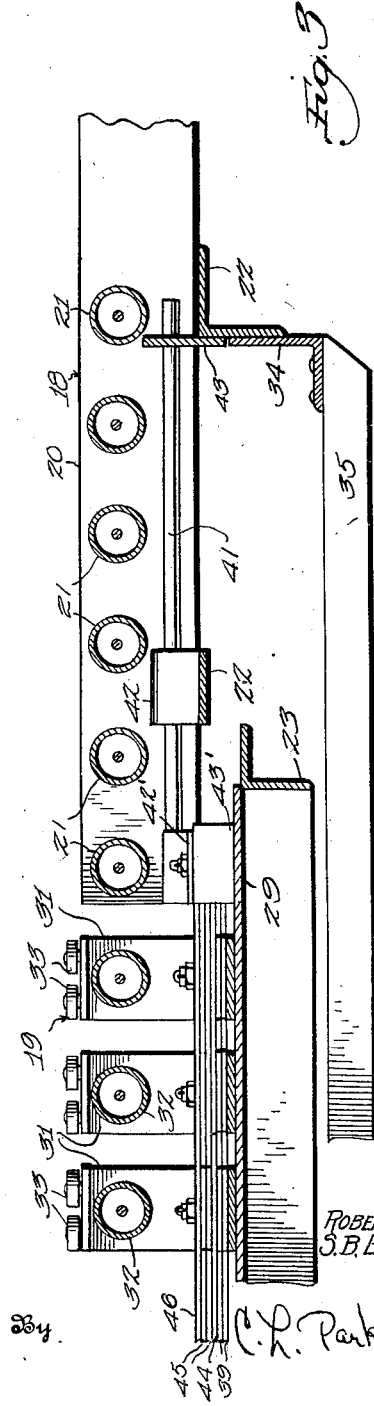

Feb. 10, 1931.   R. HALEY ET AL   1,792,011
LATTICE OPERATED FLEXIBLE SWITCH
Filed June 24, 1929   3 Sheets-Sheet 3
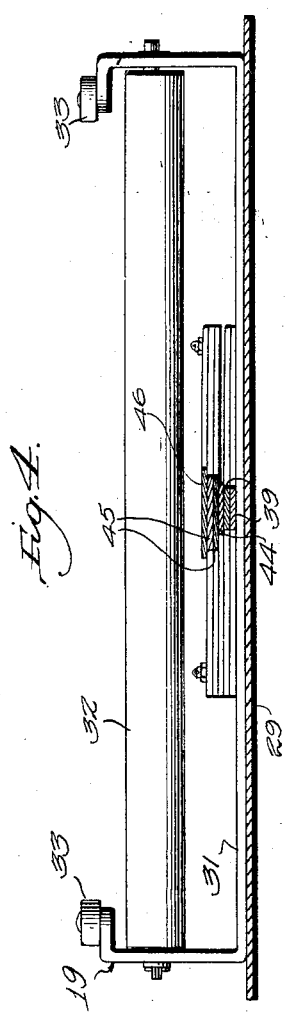
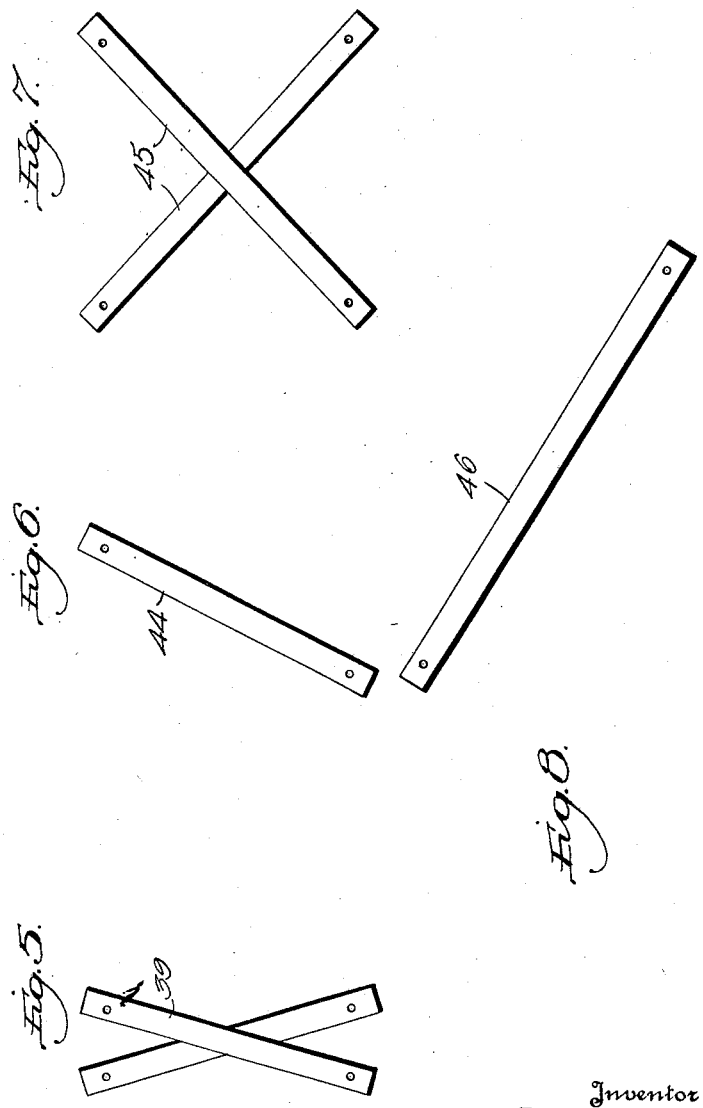
Inventor
ROBERT HALE
S.B. ELROD JR.
By
C.L. Parker Jr.
Attorney Patented Feb. 10, 1931

1,792,011

UNITED STATES PATENT OFFICE

ROBERT HALEY, OF LOUISVILLE, KENTUCKY, AND STEPHEN B. ELROD, JR., OF JEFFERSONVILLE, INDIANA, ASSIGNORS TO LOGAN CO., INC., OF LOUISVILLE, KENTUCKY, A CORPORATION OF KENTUCKY

LATTICE-OPERATED FLEXIBLE SWITCH

Application filed June 24, 1929. Serial No. 373,305.

This invention relates to lattice operated flexible switches, and more particularly to a switch construction for gravity conveyors and similar apparatus.

In the copending applications of Allen E. Crady, Serial No. 188,781, filed May 4, 1927, and Carl W. Resch, Serial No. 359,897, filed May 2, 1929, there are disclosed conveyor switch sections which include in part flexible sections made up of a series of conveyor rollers which are adapted to assume radial positions to switch articles on the conveyor from the normal path thereof to one or more branch paths.

The present device relates to the same type of apparatus as do the pending applications above referred to, and it is an important object of the present invention to provide a simplified form of apparatus for switching articles from a main conveyor connected to a source, to any of a plurality of branch conveyors.

A further object is to provide an improved means for causing the rollers of the flexible switch section to assume radial positions when it is desired to convey the articles to a branch path arranged out of alinement with the main conveyor.

A further object is to provide a simplified system of link control means for causing the flexible conveyor rollers to assume radial positions.

A further object is to provide a conveyor of the character just referred to wherein the link means is relatively simple in construction and economical to install, and which is easily operable for causing the rollers of the flexible section to accurately assume radial positions to convey the articles around a curved path.

Other objects and advantages of the invention will become apparent during the course of the following description.

In the drawings we have shown one embodiment of the invention. In this showing,

Figure 1 is a plan view,

Figure 2 is a side elevation,

Figure is a section on line 3—3 of Figure 1,

Figure 4 is a transverse section on line 4—4 of Figure 1,

Figure 5 is a plan view of a pair of the first series of operating links,

Figure 6 is a similar view of one of the second series of operating links,

Figure 7 is a similar view of a pair of the third series of operating links, and, Figure 8 is a similar view of one of the fourth series of operating links.

Referring to Figure 1, the numeral 10 designates a main conveyor section connected to a source of supply from which articles move along the conveyor in the direction of the arrow. The main conveyor section includes a pair of parallel side rails 11 between which are journaled suitable conveyor rollers 12. The apparatus is adapted to deliver articles from the main conveyor to any of a series of branch conveyors 13, 14 or 15, each of which is similar in construction to the main conveyor in that it includes parallel side rails 16 having rollers 17 journaled therebetween. Articles are adapted to be transferred from the main to any of the branch conveyors by means of switching mechanism including a straight section 18, and a flexible section 19 the ends of which are always arranged in alinement with the adjacent ends of the sections 10 and 18, as will become apparent. The straight section 18 also includes side rails 20 having suitable rollers 21 journaled therebetween, and the side rails 20 are rigidly connected to each other by cross braces 22.

Referring to Figures 1 and 2, the numerals 23 and 24 designate a pair of arcuate trackways for supporting the straight section 18, the latter being provided with suitable rollers 25 and 26 movable along the respective trackways as will be apparent. The section 18 and the parts cooperating therewith are adapted to be moved in any suitable manner, and in practice, this movement is preferably imparted by suitable motor driven means (not shown).

The present device is particularly intended for use in connection with gravity conveyors, although not necessarily restricted to such use, and accordingly the elements are illustrated in Figure 2 as being inclined, and elevated above the floor or other support 27. As shown, the track 24 is illustrated as being supported on suitable posts 28, to which the branch sections 13, 14 and 15 also are connected.

A plate 29 is adapted to support the elements of the flexible conveyor for sliding movement to its various positions. The plate 29 is supported on suitable posts 30, similar to the posts 28 previously described. It will be noted that the conveyor elements forming the section 19 are similar to the corresponding elements of the copending applications above referred to. In other words, each of the conveyor elements of the section 19 includes a transverse base plate 31 which is substantially U-shaped, and supports a conveyor roller 32 between the ends thereof. Anti-friction rollers 33 are preferably carried by the upper ends of the arms of the plates 31 to assist the turning movement of the articles when the flexible switch section assumes a curved shape.

One of the transverse cross braces 22 of the straight section 18 is provided with a depending bracket 34 connected to the ends of arms 35 which converge toward their opposite ends as shown in Figure 1. The inner ends of these arms are connected to each other by a suitable plate 36, as shown in Figure 2, and a bolt 37 passes through the plate 36 and through a bracket 38 carried by the plate 29. Accordingly it will be apparent that the straight section 18 swings in an arcuate path about the axis of the bolt 37, and it accordingly will be apparent that the trackways 23 and 24 are arranged concentric to the turning axis of the straight section 18.

From the foregoing it will be apparent that the straight section 18 is adapted to be moved into alinement with either of the branch sections 13, 14 or 15, and means is provided for effecting movement of the plates 31 to cause the rollers 32 thereof to assume radial positions when the section 18 is in alinement with either of the outer branch conveyors 13 or 15. Such means also is operative in retaining the rollers 32 in parallelism when the section 18 is in alinement with the section 14, as shown in Figure 1. As shown, the numeral 39 designates one pair of what may be termed the first series of control links for altering the positions of the rollers 32 in the manner referred to. The pairs of links 39 are crossed, as indicated in Figure 5, whereby the ends of each link are connected to adjacent plates 31 toward opposite ends thereof. A pair of these links is arranged between each adjacent pair of plates 31 throughout the length of the section 19, and the ends of the links adjacent the section 10 are pivotally connected to a stationary plate 40 which may be supported on the upper ends of the posts 30 as shown in Figure 2. The links 39 are somewhat similar in their arrangement to the well known lazy tongs construction except that the pairs of links are not pivotally connected to each other and accordingly it will be apparent that the crossing point of each pair of links is adapted to shift longitudinally of the links. Under such conditions, the links may be closer to each other at one end than the other end, and the same necessarily follows in connection with the various plates 31, whereby the latter are caused to assume radial positions.

Movement is transmitted to the links 39 upon movement of the straight section 18. Referring to Figures 1 and 3, the numeral 41 designates a pair of spaced parallel longitudinally extending guide rods mounted in guides 42 carried by the cross brace 22 adjacent the inner end of the section 18. A plate 43 extends upwardly from the next cross brace 22 to slidably support the ends of the guide rods 41. The inner ends of the rods 41 are connected to each other by a plate 42' carrying a bracket 43' to which the links 39 at the outer end of the flexible section are connected. Since the length of the longitudinal center of the flexible section varies, the links are connected to the plate 42' to permit this varying movement to take place. It will be apparent that the plate 42' is connected to the rods 41 to slide therewith so as to eliminate any binding action when the straight section 18 is moved to its various positions.

Theoretically, the links 39 may be employed alone for effecting movement of the flexible section elements to cause the rollers thereof to assume radial positions, but it is preferred that the link means referred to be supplemented by auxiliary links to steady the action of the parts and to cause them more accurately to assume the desired positions. Accordingly a second series of links 44 is provided the opposite ends of which links are connected to every other plate 31. It has been found that single links 44 rather than crossed links may be employed, and accordingly this course is followed in the interests of economy and simplicity. It has been found that the theoretical distance between the pivot points of each link 44 is constant regardless of the adjusted positions of the elements of the flexible section, and accordingly these links assist in holding the part in the proper positions with respect to each other.

A third series of links 45 is employed, and these links are preferably arranged in crossed pairs, similar to the links 39. The ends of the links 45 are preferably pivotally connected to every fourth plate 31 and the theoretical distance between the pivot points of each link 45 also is constant whereby these links likewise assist in maintaining the proper relative positions of the parts. The links previously referred to are supplemented by a fourth series of single links 46, as shown in Figure 8.

In the drawings the flexible section is illustrated as comprising eleven plates 31, and two of the links 46 are employed, the adjacent ends of these links being connected to the center plate 31 and the other ends of the links being pivotally connected to the plate 40 and the bracket 43' respectively. It will be apparent that at least one link of each series is pivotally connected to the plate 40 and to the bracket 43', and the links cooperate with each other in the manner referred to for maintaining the proper position of the elements of the flexible section with respect to each other.

The operation of the device will be apparent from the foregoing description. When it is desired to deliver articles directly from the main conveyor 10 to the central branch conveyor 14 alined therewith, the movable elements of the switch are arranged as shown in Figure 1, the sections 18 and 19 being in alinement with each other, while the rollers 32 are arranged in parallelism. Under such conditions the articles move in a straight path from the main conveyor 10, along the switch sections 19 and 18, and thus will be deposited upon the branch section 14 to be discharged therefrom at any suitable point.

When it is desired to convey articles to one of the offset branch conveyors 13 or 15, the straight section 18 is moved preferably by power means (not shown), until the section is in alinement with the proper branch section. During such movement of the branch section 18, the plate 42 transmits movement to the links of the various series connected thereto, and these links are adapted to alter their positions in the manner previously described. The crossing points of the links 39 and 45 will shift toward one end thereof to shorten the distance between the links at one end and lengthen the distance at the opposite end, thus causing the plates 31 and their associate rollers 32 to assume radial positions. The provision of the different series of links insures proper positioning of the elements of the flexible switch with respect to each other.

It is to be understood that the form of the invention herewith shown and described is to be taken as a preferred example of the same and that various changes in the shape, size and arrangement of parts may be resorted to without departing from the spirit of the invention or the scope of the subjoined claims.

We claim:

1. A conveyor comprising a main section, a plurality of branch sections, a switch section having one end arranged in alinement with said main section and its opposite end selectively movable into alinement with said branch sections, said switch section including a plurality of independently movable conveyor elements forming a flexible section, each of said elements comprising a supporting plate and a roller carried thereby, a pair of crossed links pivotally connected at their ends to each adjacent pair of plates and operative to cause said elements to define arcuate paths when the movable end of said switch is in certain positions, one end of each pair of links adjacent said main section being connected to fixed pivots, and pivot means for one end of each of the pair of links at the movable end of said switch section movable longitudinally with respect to said flexible section.

2. A conveyor comprising a main section, a plurality of branch sections, a switch including a flexible section arranged in alinement with said main section and a straight section selectively movable into alinement with said branch sections, said flexible section including a plurality of independently movable conveyor elements each comprising a supporting plate and a roller carried thereby, a pair of crossed links pivotally connected at their ends to each adjacent pair of plates and operative to cause said elements to define arcuate paths when the straight section is in certain positions, one end of each link of the pair adjacent said main section being connected to fixed pivots, a member carried by said straight section and slidable longitudinally with respect thereto, and means for pivotally connecting one end of each link of the pair adjacent said straight section to said member.

3. A flexible conveyor switch having one end anchored and the other end substantially transversely movable, said switch comprising a straight section including a plurality of rollers and a flexible section including a plurality of supporting plates and rollers carried thereby, a pair of crossed links pivotally connected at their ends to each adjacent pair of plates and operative to cause said plates and the rollers thereof to define arcuate paths when the movable end of said switch is in certain positions, one end of each pair of links adjacent the free end of said flexible section being connected to fixed pivots and pivot means for one end of each of the pair of links adjacent the free end of said straight section movable longitudinally with respect thereto.

4. A flexible conveyor switch having one end anchored and the other end substantially transversely movable, said switch comprising a straight section including a plurality of rollers and a flexible section including a plurality of supporting plates and rollers carried thereby, a pair of crossed links pivotally connected at their ends to each adjacent pair of plates and operative to cause said plates and the rollers thereof to define arcuate paths when the movable end of said switch is in certain positions, one end of each pair of links adjacent the free end of said flexible section being connected to fixed pivots, a member carried by said straight section and slidable longitudinally with respect thereto, and means for pivotally connecting one end of each link of the pair adjacent said straight section to said slidable member.

5. A flexible conveyor switch comprising a plurality of independently movable conveyor elements, link means connecting adjacent pairs of said elements and operative to cause the latter to assume a substantially arcuate path upon movement of one end of said switch, and a plurality of auxiliary links pivotally connected at their ends to certain of said conveyor elements on opposite sides of the longitudinal center of said switch and adapted to cooperate with said link means to assist in causing said elements to accurately assume such arcuate path.

6. A flexible conveyor switch having one end anchored and the other end substantially transversely movable, said switch including a plurality of independently movable conveyor elements each comprising a supporting plate and a roller carried thereby, a pair of crossed links pivotally connected at their ends to the plates of each adjacent pair and operative to cause the latter together with their associated rollers to define arcuate paths upon movement of the last named end of said switch, and a plurality of auxiliary links pivotally connected at their ends to certain of said plates on opposite sides of the longitudinal center of said switch and adapted to cooperate with said link means to assist in causing said rollers to accurately assume such arcuate paths.

7. A flexible conveyor switch having one end anchored and the other end substantially transversely movable, said switch including a plurality of independently movable conveyor elements each comprising a supporting plate and a roller carried thereby, a plurality of pairs of crossed links, pivot pins for connecting the ends of each pair of links to adjacent pairs of said plates at points equidistantly spaced on opposite sides of the longitudinal center of said switch, said links being operative to cause said rollers to define arcuate paths upon movement of the last named end of said switch, and a plurality of series of auxiliary links adapted to cooperate with said first named links to assist in causing said rollers to accurately assume such arcuate paths, each link of said series being connected at its ends to certain of said pivot pins on opposite sides of the longitudinal center of said switch.

In testimony whereof we affix our signatures.

ROBERT HALEY.
STEPHEN B. ELROD, Jr.